Nov. 22, 1949     A. T. CARTER     2,488,659
RAKE ATTACHMENT

Filed Oct. 15, 1947     2 Sheets-Sheet 1

INVENTOR.
Arthur T. Carter
BY *Victor J. Evans & Co.*
ATTORNEYS

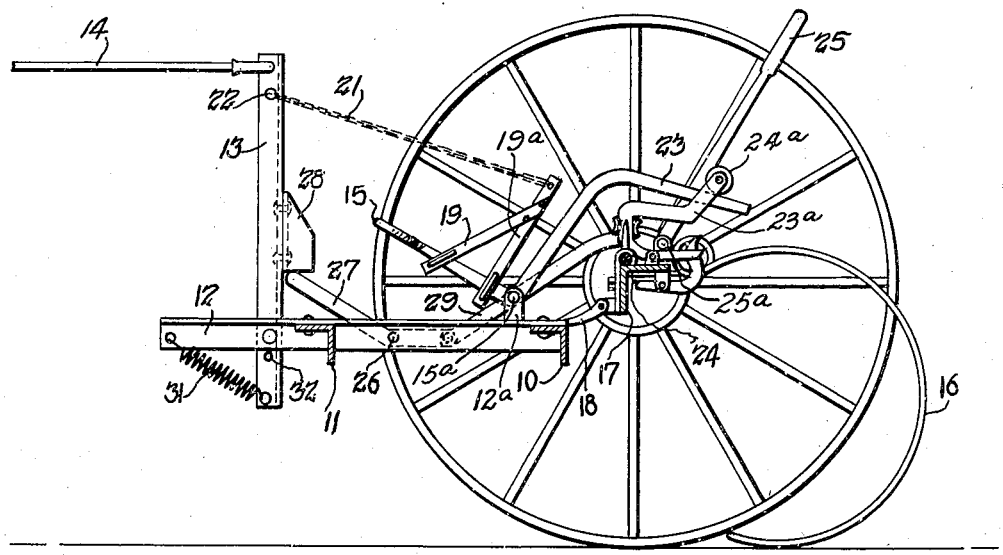
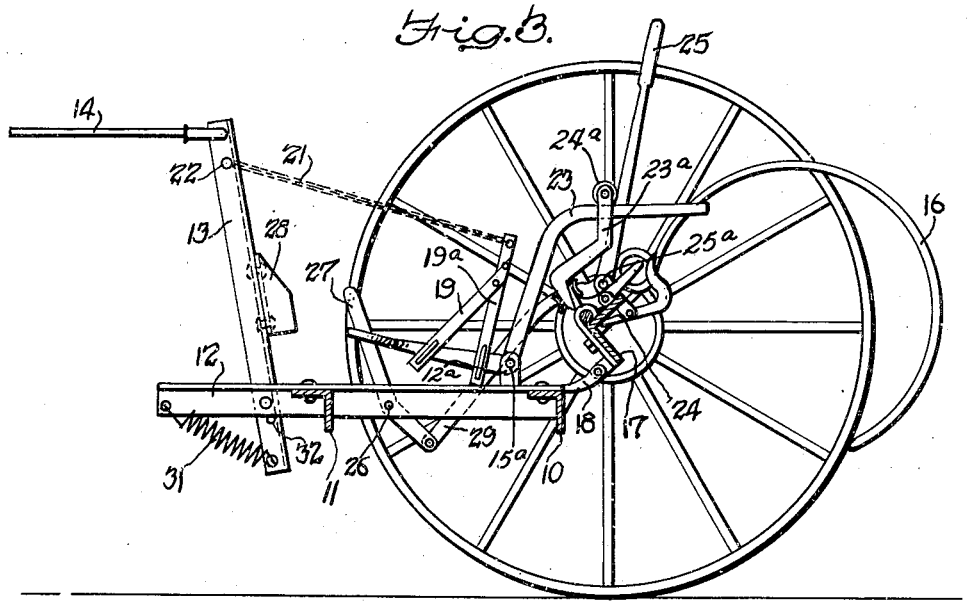
INVENTOR.
Arthur T. Carter.
BY Victor J. Evans & Co.
ATTORNEYS Patented Nov. 22, 1949

2,488,659

UNITED STATES PATENT OFFICE 2,488,659

RAKE ATTACHMENT

Arthur T. Carter, Sidney, Nebr.

Application October 15, 1947, Serial No. 779,887

1 Claim. (Cl. 56—386)

This invention relates to hay rakes.

It is an object of the present invention to provide a hay rake adapted to be connected to a tractor to be pulled by the same with a control device adapted to retain the rake on the ground when being pulled and adapted to release the rake to permit the same to be raised when a pull cord extending to the tractor is pulled so as to permit rake teeth to be elevated.

Other objects of the present invention are to provide a control device for a hay rake for the purpose of retaining the same in the ground position, which is of simple construction, inexpensive to manufacture, and efficient in operation.

Figure 1:
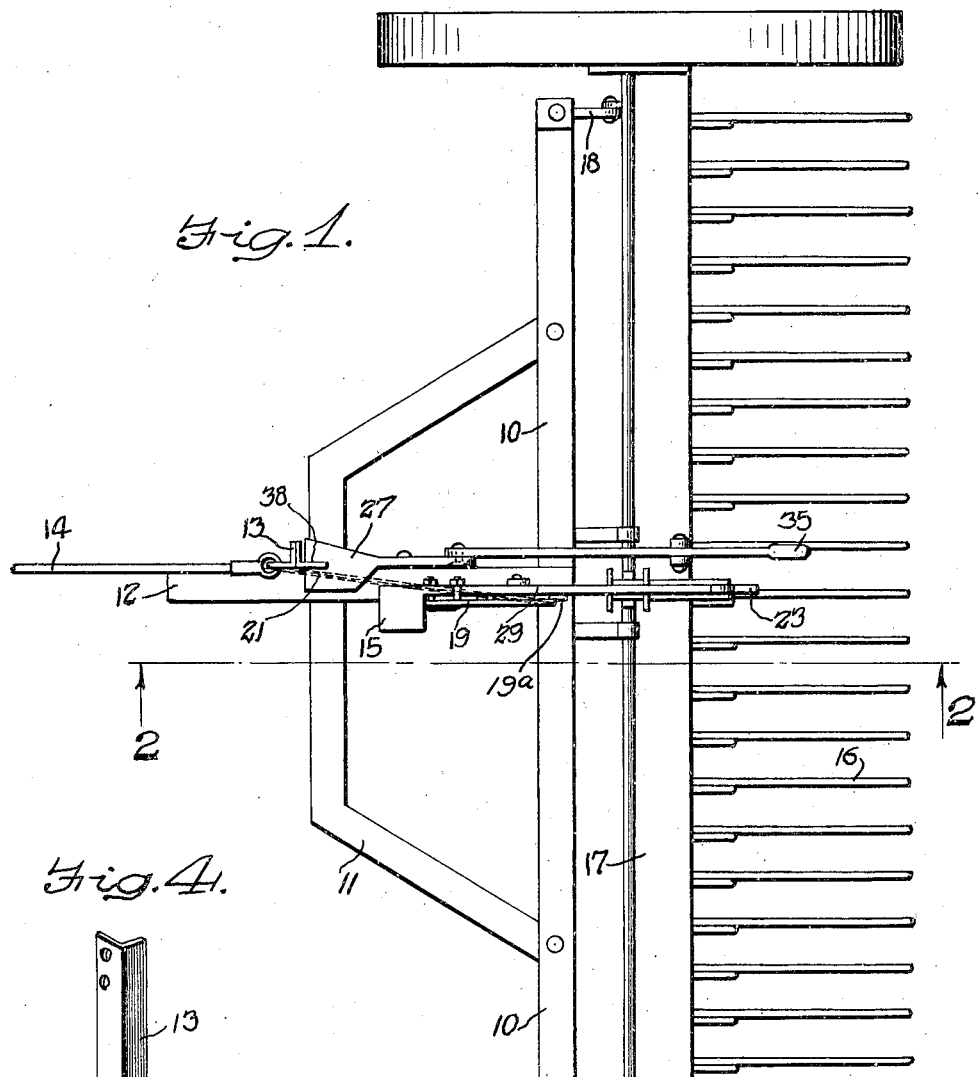
Figure 4:
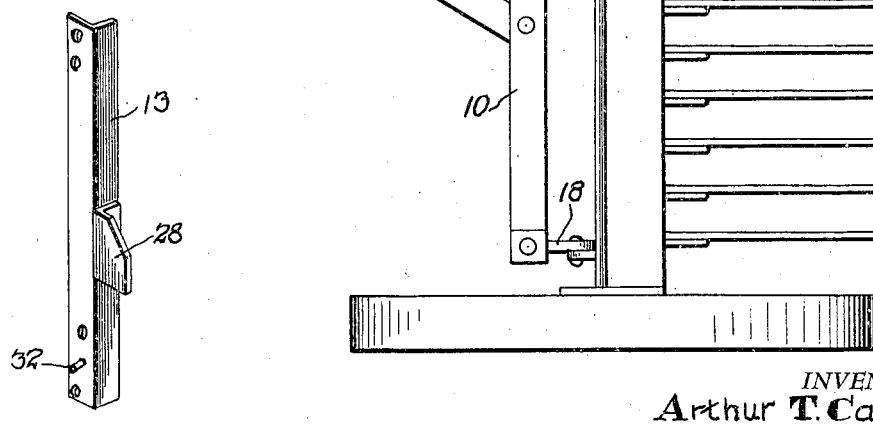

For a better understanding of the invention reference may be had to the following detailed description taken in connection with the accompanying drawing, in which Fig. 1 is a top plan view of the hay rake having the control arrangement embodying the features of the present invention, Fig. 2 is a longitudinal sectional view taken through the rake on line 2—2 of Fig. 1 and with the rake teeth lowered, Fig. 3 is a cross-sectional view taken also generally on line 2—2 of Fig. 1 showing the position of the parts when the rake teeth have been elevated, Fig. 4 is a perspective view of the pull latch for engaging the hold down lever and which is released when it is desired to elevate the rake teeth.

Referring now to the figures, 10 represents a transversely extending frame member to which there is connected to extend forwardly thereof a U-shaped member 11. Extending forwardly from the transverse member 10 and over the U-shaped member 11 is an angle piece 12 on which there is pivotally connected a latch lever 13 having a pull cord 14 adapted to extend forwardly for connection with the tractor so as to be accessible to the operator of the tractor at times when a lifting lever 15 is to be operated to elevate rake teeth 16 carried on a transverse piece 17 which is pivotally connected to brackets 18 on the transverse piece 10. The lever 15 has extensions 19 and 19a thereon which are connected by a chain 21 to the upper end of lever 13 at a location thereon as indicated at 22. The lifting lever 15 is pivotally connected at 15a to a bracket 12a on the angle pin 12. The lifting lever 15 has a curved arm 23 which extends upwardly from the pivot 15a and then over the piece 17 for operative connection with a bracket 24 on the underside of the piece 17 by means of the lever 23a carried by the bracket 24. A roller 24a carried by the upper end of the lever 23a engages the arm 23 to permit easy operation of the two in relation to each other. A hand arm 25 extends upwardly from its connection at 25a with the piece 17 to provide means for lifting the rake teeth by hand.

Pivoted on the angle piece 12 at 26 is a hold down lever 27 with which the forward end of a projection 28 of latch lever 13 engages. A link 29 extends from the rear end of the lever 27 which connects with the hand arm 25. When the rake teeth 16 are lowered as shown in Fig. 2 the lever 27 will be retained in its forwardly extended position and the rake teeth 16 will be held down.

As the cord 14 is pulled and the rake teeth 16 are to be raised by the lever 15, the hold down lever 27 is released so that the rake teeth 16 will be made free so that they may be elevated or raised. As the pull cord 14 is released the lever 13 will be returned to its vertical position by a tension spring 31 connected between the forward end of the piece 12 and the lower end of the lever 13. Stop pin 32 limits the pivotal movement of the lever 13 by its engagement with the bottom edge of the piece 12. At the same time the pull cord is released to lower the rake teeth 16, the hold down lever 27 will pivot forwardly to locate itself under the projection 28. Any upward movement of the rake teeth 16 during the raking operation will accordingly be resisted by the latch lever 13.

While various changes may be made in the detail construction it shall be understood that such changes shall be within the spirit and scope of the present invention as defined by the appended claim.

I claim:

A hay rake comprising a transversely extending frame piece, a U-shaped member connected to the transversely extending frame piece and extending forwardly thereof, a second transverse member pivotally connected to the first member, rake teeth carried on the second transverse member, so that as the second transverse member is pivoted the rake teeth will be extended between raised and lowered position, a forwardly extending angle piece connected at its rear end to said frame piece and extending over said U-shaped member and fixed to said U-shaped member adjacent the forward end of said angle piece, a hold-down lever pivotally connected to said angle piece intermediate of said frame piece and said U-shaped member, a lifting lever pivoted on the transversely extending frame piece to pivot the transversely extending member whereby to raise the rake teeth, a link connected between the second transverse member and the lever so that the hold down lever will be operated as the rake teeth are raised and lowered, a vertically-extending latch lever pivoted on the forwardly extending angle piece extending between the transversely extending frame piece and the forwardly extending U-shaped member, said lever having a pull cord thereon adapted to be extended forwardly for connection with a tractor, said latch lever having a projection adapted to engage the hold down lever when the rake teeth are in their lowered position, and a chain extending between the lifting lever and the latch lever, a tension spring for effecting the return of the latch lever to a position to be engaged by the hold down lever, and stop means on the latch lever for limiting the pivotal movement of the same upon the supporting frame.

ARTHUR T. CARTER.

REFERENCES CITED

The following references are of record in the file of this patent:

UNITED STATES PATENTS

| Number | Name | Date |
|---|---|---|
| 2,300,164 | Musselman | Oct. 27, 1942 |